United States Patent [19]

Leben et al.

[11] Patent Number: 4,752,542

[45] Date of Patent: Jun. 21, 1988

[54] ACTIVATABLE BATTERY

[75] Inventors: Yannick Leben, Bobigny; Louis D'Ussel, Paris, both of France

[73] Assignee: Saft, S.A., Romainville, France

[21] Appl. No.: 39,228

[22] Filed: Apr. 17, 1987

[30] Foreign Application Priority Data

Dec. 10, 1986 [FR] France .................... 86 17277

[51] Int. Cl.$^4$ .................................... H01M 6/34
[52] U.S. Cl. ............................... 429/119; 429/118; 429/120; 429/81
[58] Field of Search .............. 429/52, 118, 119, 81, 429/120

[56] References Cited

U.S. PATENT DOCUMENTS

| 3,321,335 | 5/1967 | Wilson ............................ 429/119 |
| 3,647,555 | 3/1972 | Daniel ........................ 429/118 X |
| 3,713,413 | 1/1973 | Nakamura ................. 429/119 X |
| 4,710,438 | 12/1987 | Leben et al. ................. 429/119 |

FOREIGN PATENT DOCUMENTS 57-78772  5/1982  Japan .................................. 429/119

Primary Examiner—Brian E. Hearn
Assistant Examiner—Stephen J. Kalafut
Attorney, Agent, or Firm—Kenyon & Kenyon

[57] ABSTRACT

In an activatable AgO/Al battery, the electrolyte tank is partitioned into two portions (31, 32) which are simultaneously filled on activation. During a first discharge stage electrolyte in one of said portions (31) is used and is then removed from the battery. During the second discharge stage, the battery operates using concentrated electrolyte to be found in the second portion (32) of the tank.

6 Claims, 5 Drawing Sheets

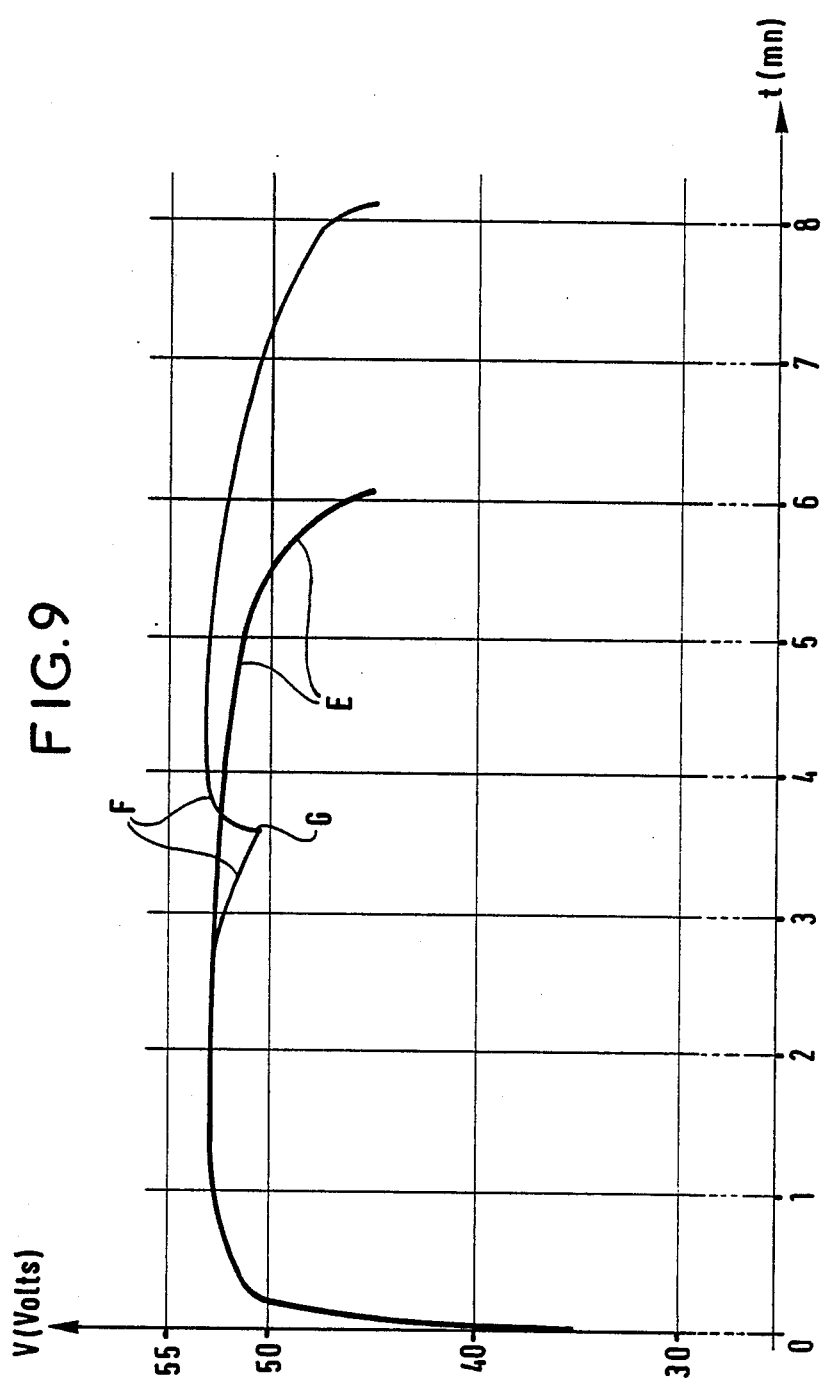

ACTIVATABLE BATTERY

The present invention relates to a battery which is activatable by water or by seawater, and which makes use, in particular, of the AgO/Al electrochemical couple. A battery of this type is used, in particular, in the propulsion of underwater vehicles.

BACKGROUND OF THE INVENTION

In outine, such a battery comprises:

an electrochemical block implementing AgO/Al couples and having an inlet and an outlet of a circuit for distributing an electrolyte based on sodium hydroxide; and said electrolyte distribution circuit comprises an inlet for seawater, a pump for pumping the electrolyte, a tank of electrolyte in solution including a first outlet which is directly connected to a first inlet of a thermostatic valve and a second outlet which is connected via a heat exchanger to a second inlet to said thermostatic valve whose outlet is connected to the inlet of said electrochemical block.

When the battery is activated, a valve is opened to cause seawater to enter into the electrolyte tank which contains solid sodium hydroxide, and the electrolyte distribution circuit is activated.

During discharge, aluminates form in the electrolyte and their concentration in such that they impose a limit on the duration for which the battery can be discharged. The concentration of aluminates is directly proportional to the electrical capacity delivered by the battery.

One way of avoiding this limitation on capacity would be to increase the volume of the electrolyte; however, this is impossible in most of the applications concerned because of the additional mass and bulk that result therefrom.

The aim of the present invention is to solve the problem of eliminating aluminates in a simple manner while avoiding the above-mentioned drawbacks.

SUMMARY OF THE INVENTION

The present invention provides a battery activatable by seawater and comprising an electrochemical block implementing AgO/Al couples having an inlet and an outlet for an electrolyte distribution circuit for distributing an electrolyte based on sodium hydroxide, together with said electrolyte distribution circuit which comprises:

an inlet for seawater;
an exhaust outlet to the sea;
a pump for pumping the electrolyte;
a tank for electrolyte in solution having a first outlet connected directly to a first inlet of a thermostatic valve and having a second outlet connected via a heat exchanger to a second inlet to said thermostatic valve, said thermostatic valve having its outlet connected to the inlet to said electrochemical block;

said electrolyte tank being provided with a partition separating it into a first tank and a second tank capable of being put into communication with each other; and said electrolyte distribution circuit further including means for emptying said first tank after a determined duration of discharge and means for immediately filling it with fresh electrolyte and contained in said second tank.

Preferably, said first and second tanks are simultaneously filled with seawater at the moment the battery is activated, said first tank containing sodium hydroxide in powder form before activation, and said second tank containing sodium hydroxide pellets.

BRIEF DESCRIPTION OF THE DRAWINGS

An embodiment of the invention is described by way of example with reference to the accompanying drawings, in which:

FIG. 9 is a graph showing the discharge curves of a prior art battery and of a battery in accordance with FIG. 2.

DESCRIPTION OF THE PREFERRED EMBODIMENTS

Figure 1:
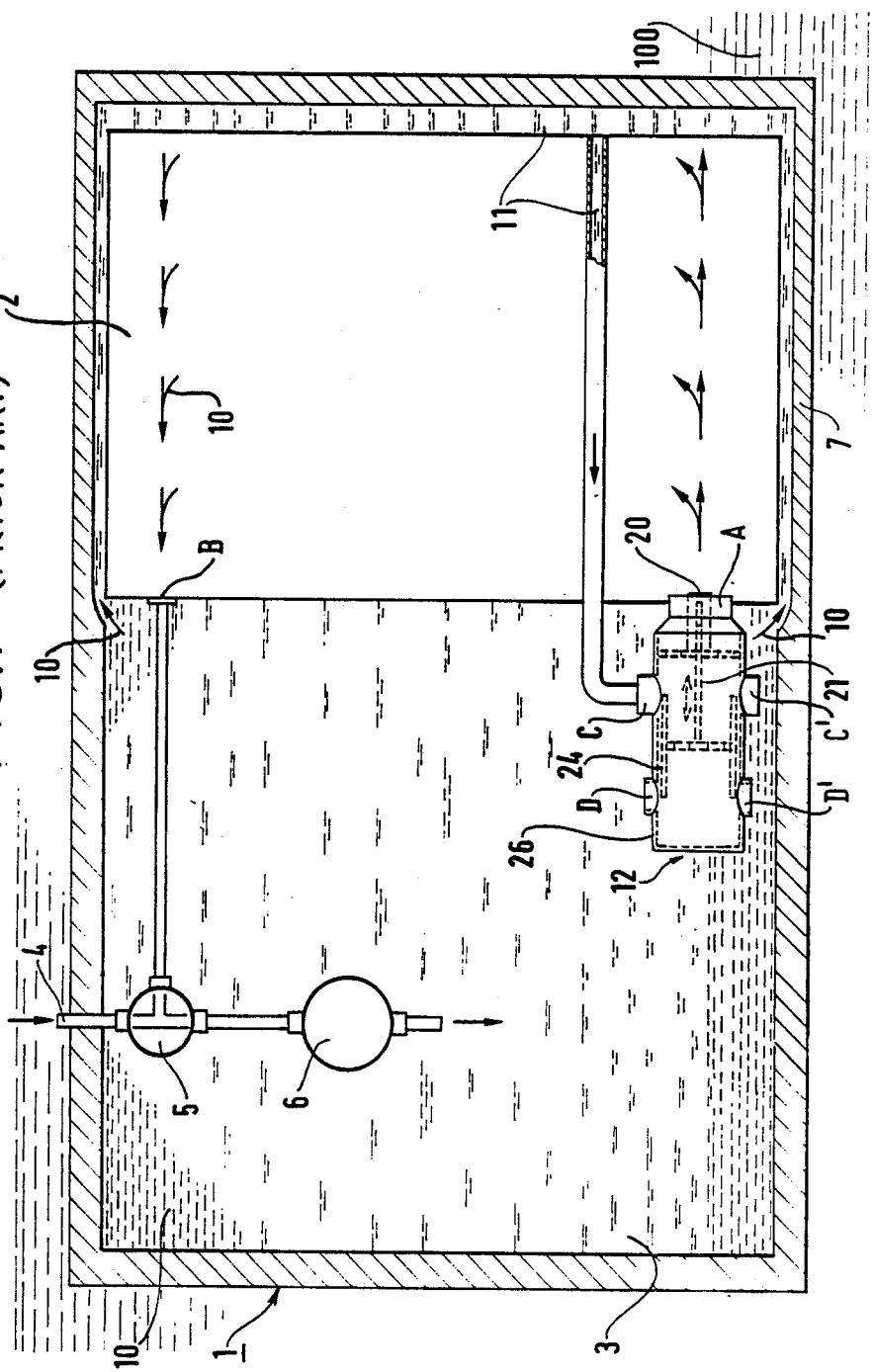
FIG. 1 is a fragmentary diagrammatic section through a prior art activatable battery.

Very diagrammatically, FIG. 1 shows a prior art activatable battery disposed in the hull 1 of a vehicle immersed in seawater 100. The battery inclues activating members which do not form the subject of the present application, an electrochemical block 2 constituted by AgO/Al couples, and an electrolyte distribution circuit for distributing electrolyte 10, said electrolyte entering via an orifice A into the block 2 and leaving block 2 via an orifice B.

The distribution circuit comprises a tank 3, and a pump 6 connected to a seawater inlet 4 via a valve 5.

The electrochemical block 2 is surrounded by a heat exchanger 7 which is essential since the electrolyte 10 heats up during discharge. The hot electrolyte 10 flows between the electrochemical block 2 and the hull 1 in such a manner as to be cooled by seawater. The cooled electrolyte 11 leaving the heat exchanger 17 via the orifice C may be reinjected to the inlet A of the electrochemical block 2 via a thermostatic valve 12. FIG. 1 shows inlets D, D' of the thermostatic valve 12 for hot electrolyte 10, and inlets C, C' for cooled electrolyte 11 coming from the heat exchanger 7. The thermostatic valve 12 is provided with a thermostatic capsule 20 and with a moving rod 21 which moves as a function of temperature and which cooperates with a piston 24 received in a body 26. The piston 24 is suitable for closing the inlets D, D', C and C' to a greater or lesser extend in order to regulate the temperature of the electrolyte.

Figure 2:
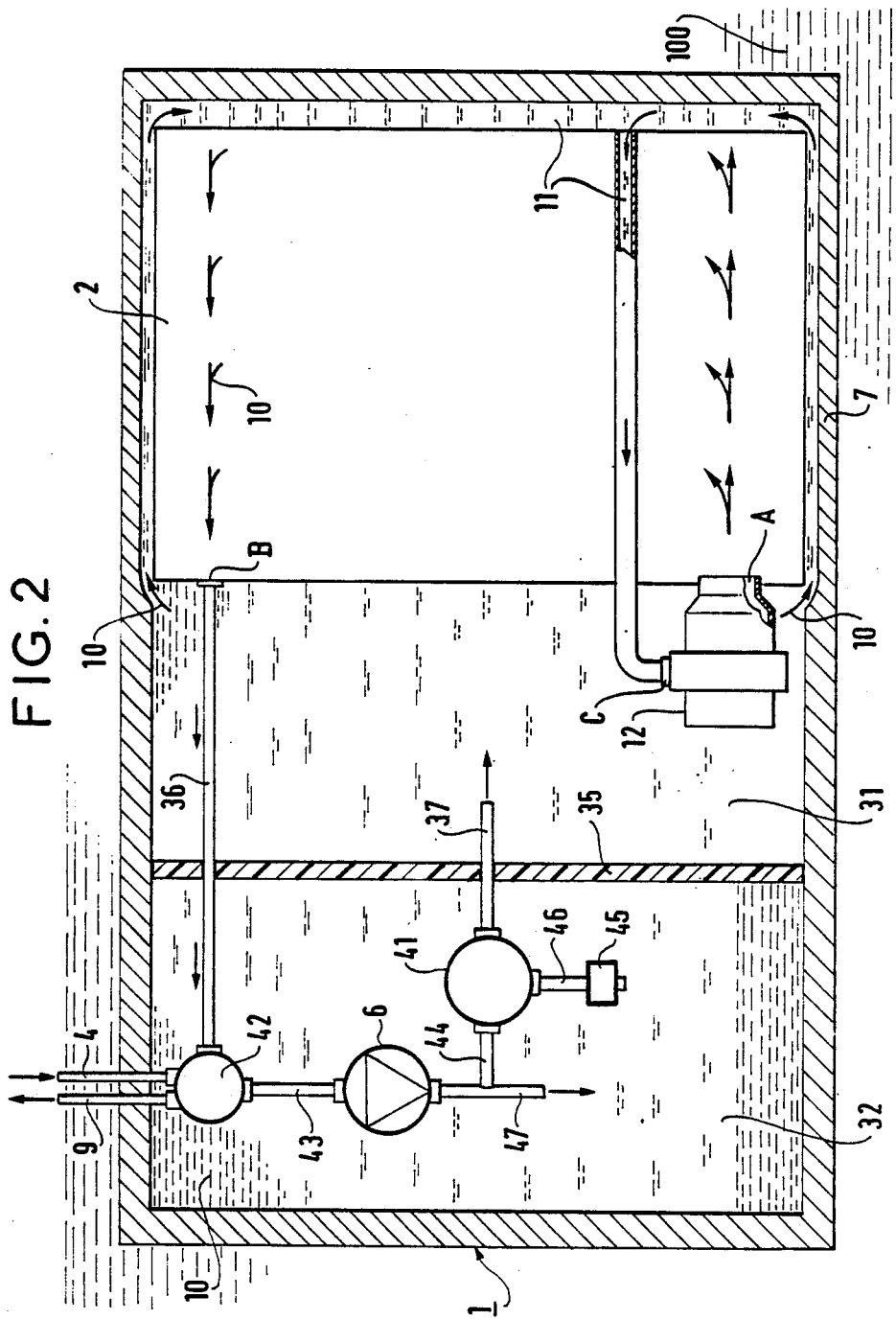
FIG. 2 is a fragmentary diagrammatic section through a battery in accordance with the invention.

In a battery in accordance with the invention and as shown in FIG. 2, items which are analogous to those as shown in FIG. 1 have been given the same reference numerals.

Thus, the battery shown in FIG. 2 includes an electrochemical block 2 having an electrolyte inlet A and an electrolyte outlet B, a heat exchanger 7 and a thermostatic valve 12.

However, the tank 3 shown in FIG. 1 is replaced by a tank of substantially the same volume but partitioned by a wall 35 which may be made of plastic material, for example. This wall defines a first tank 31 which, prior to the battery being activated, contains sodium hydroxide in powder form, and a second tank 32 which, prior to the battery being activated, contains sodium hydroxide, preferably in pellet form.

The electrolyte distribution circuit comprises:

a pump 6 having a pipe 47 which opens out into the tank 32;

a valve 42 capable of communicating with a seawater inlet 4, a seawater outlet 9, the pump 6 via a pipe 43, and the outlet B from the electrochemical block 2 via a pipe 36 passing through the wall 35;

a valve 41 capable of communicating with the pump 6 via a pipe 44, with the tank 31 via a pipe 37 passing through the wall 35, and the tank 32 via a pipe 46 provided with a filter 45 and intended to prevent sodium hydroxide pellets from passing; and a control device (not shown in the figure) for the two valves 41 and 42 and controlled, in particular, by the voltage appearing across the terminals of the electrochemical block 2.

Figure 3:
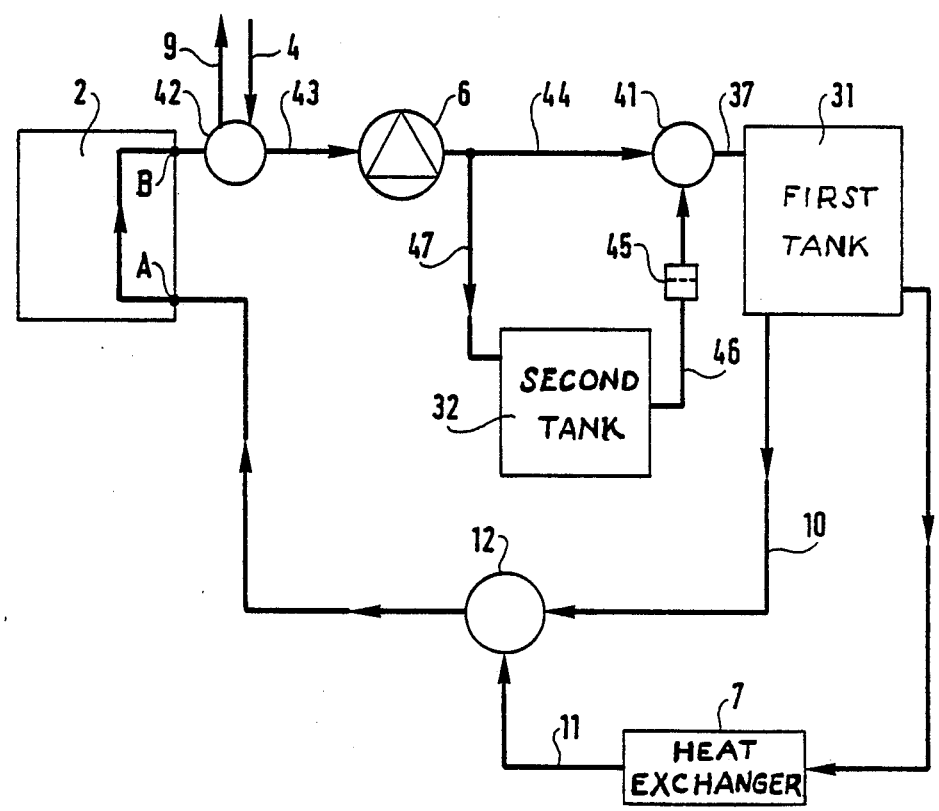
FIG. 3 is a diagram showing how the FIG. 2 device operates.
Figure 4A:
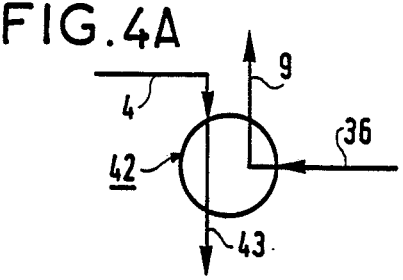
FIGS. 4A-4B, 5A-5B, 6A-6B, 7A-7B, and 8A-8B are diagrams showing the states of the two valves in the FIG. 2 device at various different stages of operation.
Figure 4B:
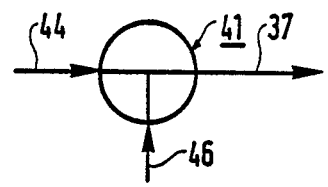

FIG. 3 is a diagram for showing how the battery shown in FIG. 2 operates. When the battery is activated, which may take several seconds, e.g. 4 to 6 seconds (see FIGS. 4A and 4B), the valve 42 puts the seawater inlet 4 into communication with the pump 6 via the pipe 43. The tank 32 is filled via the pipe 47. Simultaneously, the valve 41 puts the pump into communication with the pipe 37 via the pipe 44, thereby enabling the tank 31 to be filled. In order to ensure that both tanks are completely filled, a portion of the water in the tank 32 is passed through the filter 45 and then, via valve 41, into pipe 37. Once filling has been completed, and the electrochemical block 2 is completely full, the pipe 36 delivers overflow electrolyte via the valve 42 to the seawater outlet 9.

The sodium hydroxide in powder form in the tank 31 dissolves immediately whereas the sodium hydroxide in pellet form in the tank 32 takes several minutes to dissolve.

Figure 5A:
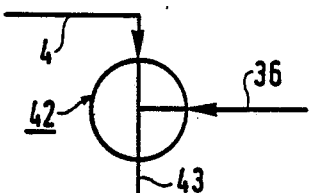
Figure 5B:
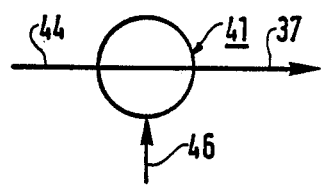

When a voltage appears across the terminals of the electrochemical block 2 (see FIGS. 5A and 5B,) the valve 42 interrupts the exhaust to the outlet 9, and the valve 41 closes the connection between the tank 31 and the tank 32.

Figure 6A:
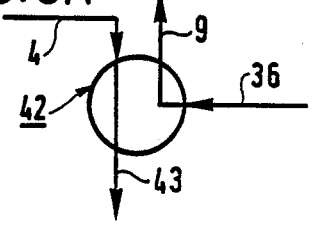
Figure 6B:
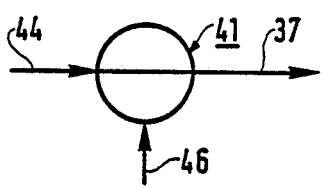

As discharge continues, high electric power is required at the concentration in aluminates increases. This concentration becomes so high that a fall in voltage is detected across the terminals of the electrochemical block, i.e., the aluminate concentration is approaching a maximum acceptable value. At this moment, the control device begins the stage shown in FIGS. 6A and 6B which consists of completely removing the initial electrolyte from the tank 31 and replacing it with seawater and with the electrolyte to be found in the tank 32.

At the valve 42 (see FIG. 6A,) the pipe 36 is put into communication with the outlet 9 and seawater enters via the inlet 4. At the valve 41, the seawater enters via the pipe 37 into the tank 31.

Figure 7A:
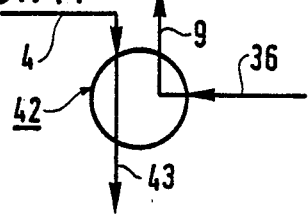
Figure 7B:
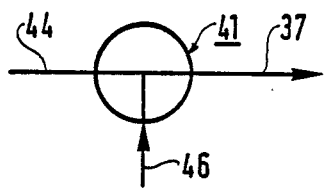
Figure 8A:
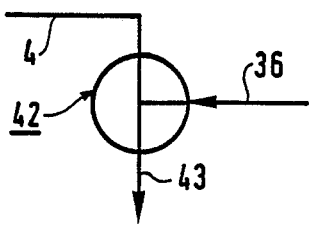
Figure 8B:
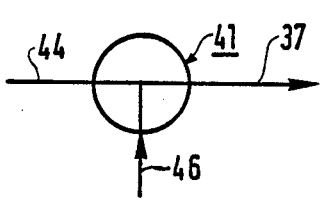

After a few seconds of flushing, the concentrated electrolyte in the tank 32 is introduced into the tank 31 (see FIGS. 7A and 7B), and the system then reaches the situation illustrated in FIGS. 8A and 8B. Both the tanks and the electrochemical block are filled with fresh electrolyte at the proper concentration, and the electrochemical block 2 may continue to discharge at the required level for a few more minutes.

EXAMPLE

The volume of the electrolyte used in the first stage of discharge is 3 liters, and the volume of the tank 32 is 2.3 liters, thus giving a total volume of 5.3 liters which is comparable with the total volume of the FIG. 1 battery which is also 5.3 liters;

the initial concentration in the electrolyte in tank 31 is about 8N;

the initial concentration in the electrolyte in the tank 32 is about 17N;

the electrolyte flowrate is 1.33 m$^3$/hour;

the total duration of discharge is eight minutes;

the power delivered is about 20 kwatts; and the heat exchanger must be suitable for ensuring that the temperature of the electrolyte entering the battery is maintained at about 81° C.

The concentration of aluminates in the electrolyte in the tank 31 never exceeds a critical value, which in the present example is 3 moles/liter. Under different operating conditions (current intensity, operating temperature, . . . ) this critical value may lie anywhere in the range of 2.5 moles per liter to 4.5 moles per liter.

FIG. 9 is a graph showing the variation in the delivered voltage V as a function of time t (in minutes) of a prior art battery (curve E) and of a battery in accordance with the invention (curve F).

It can be seen that the prior art battery (FIG. 1) whose total volume of electrolyte is 5.3 liters suffers from its voltage V dropping off after 6 minutes of operation.

In the battery in accordance with the invention (FIG. 2) the total volume of electrolyte is likewise 5.3 liters, and here again, after an initial period of three to four minutes, the delivered voltage drops off (at point G); however, this causes the tank 31 to be flushed with seawater and then refilled with fresh electrolyte as described above, and as a result, the battery continues to operate for a total period of about eight minutes.

Naturally, the invention is not limited to the above-described embodiment. The best implementation consists of completely flushing the tank 31 so as to remove substantially all of the aluminates from the electrolyte. However, it may be flushed only partially, with the electrolyte being only partially regenerated for the second discharge stage.

What is claimed is:

1. A battery activatable by seawater, the battery including an electrochemical block implementing AgO-/Al couples, the block having an inlet and an outlet for electrolyte, and an electrolyte distribution circuit for delivering a sodium hydroxide-based electrolyte to the inlet and withdrawing electrolyte from the outlet of the electrochemical block, wherein the electrolyte distribution circuit comprises:

an inlet for seawater;

an exhaust outlet;

a pump having an inlet and an outlet;

a first electrolyte tank having an inlet communicating with the outlet of the pump, and an outlet;

a second electrolyte tank having an inlet communicating with the outlet of the pump and an outlet;

means for selectively communicating the inlet of the pump with the inlet for seawater;

means for selectively communicating the outlet of the electrochemical block with one of the exhaust outlet and the pump inlet;

means for communicating the outlet of the first tank with the inlet of the electrochemical block; and means for selectively communicating the inlet of the first tank with the outlet of the second tank.

2. An activatable battery according to claim 1 wherein the first tank contains a first amount of dry sodium hydroxide and the second tank contains a second amount of dry sodium hydroxide.

3. An activatable battery according to claim 2 wherein the dry sodium hydroxide in the first tank is in powder form and the dry sodium hydroxide in the second tank is in pellet form.

4. An activatable battery, according to claim 2 wherein the second amount of dry sodium hydroxide is greater than the first amount.

5. An activatable battery according to claim 4 wherein the first amount of dry sodium hydroxide is such as to provide a predetermined concentration when mixed with a volume of seawater equal to the electrolyte capacity of the electrochemical block and the electrolyte distribution circuit less than the volume of the second tank, and the second amount of dry sodium hydroxide is such as to provide a comparable concentration when mixed with a volume of seawater equal to the electrolyte capacity of the electrochemical block and the electrolyte distribution circuit, including both the first and second tanks.

6. An activatable battery according to claim 1 wherein the electrolyte distribution circuit further comprises a heat exchanger having an electrolyte inlet and an electrolyte outlet; the first tank has an additional outlet communicating with the inlet of the heat exchanger; and the means for communicating the first-mentioned outlet of the first tank with the inlet of the electrochemical block comprises means for communicating the inlet of the electrochemical block with both the outlet of the first tank and the outlet of the heat exchanger and means for controlling the relative degree of communication with each outlet as a function of the temperature of the electrolyte in the electrochemical block.

* * * * *

UNITED STATES PATENT AND TRADEMARK OFFICE
CERTIFICATE OF CORRECTION

PATENT NO. : 4,752,542
DATED : 21 June 1988
INVENTOR(S) : Yannick LEBEN et al.

It is certified that error appears in the above-identified patent and that said Letters Patent is hereby corrected as shown below:

| Column | Line | |
|--------|------|---|
| ABSTR. | 4  | after "stage" insert comma. |
| 1      | 67 | after "electrolyte" delete "and". |
| 2      | 29 | change "inclues" to --includes--. |
| 2      | 54 | change "extend" to --extent--. |
| 3      | 42 | change "...5B,)" to --...5B),--. |
| 3      | 47 | change "at" to --and--. |
| 3      | 56 | change "...6A,)" to --...6A),--. |

Signed and Sealed this

Fourth Day of October, 1988

*Attest:*

DONALD J. QUIGG

*Attesting Officer*  *Commissioner of Patents and Trademarks*